(12) United States Patent
Kim

(10) Patent No.: US 6,301,469 B1
(45) Date of Patent: Oct. 9, 2001

(54) METHOD FOR AUTOMATICALLY SWITCHING ANTENNA MODE IN PORTABLE TELEPHONE

(75) Inventor: Jong-Myung Kim, Kyongsangbuk-do (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/294,948

(22) Filed: Apr. 20, 1999

(30) Foreign Application Priority Data

Jul. 28, 1998 (KR) .................................................. 98-30330

(51) Int. Cl.$^7$ .................................................. H04B 1/38

(52) U.S. Cl. .......................... 455/90; 455/277.2; 343/702

(58) Field of Search ................................... 455/90, 277.2, 455/550, 226.2; 343/702, 903, 901

(56) References Cited

U.S. PATENT DOCUMENTS

| | | |
|---|---|---|
| 5,212,725 | 5/1993 | Yamamato et al. . |
| 5,689,821 | 11/1997 | Shimazaki . |
| 5,991,637 * | 11/1999 | Mack et al. ........................... 455/550 |
| 6,067,449 * | 5/2000 | Jager ................................. 455/277.2 |

* cited by examiner

Primary Examiner—Lee Nguyen
(74) Attorney, Agent, or Firm—Dilworth & Barrese, LLP

(57) ABSTRACT

A portable telephone with an extendible antenna automatically switches an antenna mode according to a received signal strength. The portable telephone measures an RSSI value while a call is processed in an internal antenna mode where the antenna is retracted, to compare the measured RSSI value with a threshold value. If the RSSI value is lower than the threshold value, the antenna is extended, thereby switching the antenna mode to an external antenna mode. In the meantime, if the call is terminated, the antenna is retracted, switching the antenna mode back to the internal antenna mode.

12 Claims, 2 Drawing Sheets

METHOD FOR AUTOMATICALLY SWITCHING ANTENNA MODE IN PORTABLE TELEPHONE

BACKGROUND OF THE INVENTION

1. Field of the Invention

The present invention relates to a portable telephone with an extendible antenna, and more particularly, to a method for automatically switching an antenna mode according to a received signal strength.

2. Description of the Related Art

In general, a portable telephone employs an extendible antenna which can be extended from the top of the telephone. The extendible antenna is extended (or stretched out) in an external antenna mode, and retracted (or unstretched) in an internal antenna mode. Both manual and automatic antenna mode switching techniques have been used to implement the extension/retraction operations.

In the manual antenna mode switching technique, the portable phone user extends and retracts the antenna by hand. The user typically extends the antenna when reception sensitivity is poor during a call. This method is inconvenient to the user, and may also cause a noise problem. That is, if the user extends the antenna by hand when a received signal strength indication (RSSI) value is poor, noise may be introduced to the receiver when the antenna is physically touched. Worse, the call may be disconnected as a result of the added noise. The RSSI value, which is measured by circuitry within the portable phone, is a measure of the strength of the communication signal transmitted by the base station to the portable phone.

With the automatic antenna mode switching technique, the antenna is automatically extended when the user initiates the call and automatically retracted when the user terminates the call. In this case, the antenna is extended and retracted by an antenna moving mechanism (actuator) employing a motor. A drawback to this technique, however, is that the antenna is automatically extended when the call is initiated, regardless of the user's intention. That is, the antenna is extended even when the RSSI value is satisfactory. Such unconditional extension of the antenna when the call is initiated may annoy the user, or result in damage to the antenna due to carelessness of the user.

SUMMARY OF THE INVENTION

Accordingly, an object of the present invention is to provide a method for automatically switching an antenna mode according to a received signal strength.

To achieve the above object of the present invention, a method for automatically switching an antenna mode in a portable telephone with an extendible antenna is disclosed. In the method, the portable telephone measures an RSSI value during a communication session in an internal antenna mode where the antenna is retracted, and compares the measured RSSI value with a threshold value. If the RSSI value is lower than the threshold value, the antenna is extended, thereby switching the antenna mode to an external antenna mode. In the meantime, if the call is terminated, the antenna is retracted, switching the antenna mode back to the internal antenna mode. Optionally, the method can be tailored to give the user the option of setting the antenna switching mode function.

BRIEF DESCRIPTION OF THE DRAWINGS

The foregoing and other objects, features and advantages of the present invention will become more apparent from the following detailed description when taken in conjunction with the accompanying drawings in which.

DETAILED DESCRIPTION OF THE PREFERRED EMBODIMENT

Reference will now be made in detail to the preferred embodiment of the present invention. In the following description, specific details such as processing flow have been set forth to provide a more through understanding of the present invention. It will be apparent, however, to one skilled in the art that the present invention is not limited to these specific details. Moreover, a description of known functions and structure unnecessarily obscuring the subject matter of the present invention has been omitted in this detailed description for clarity of presentation.

Figure 1:
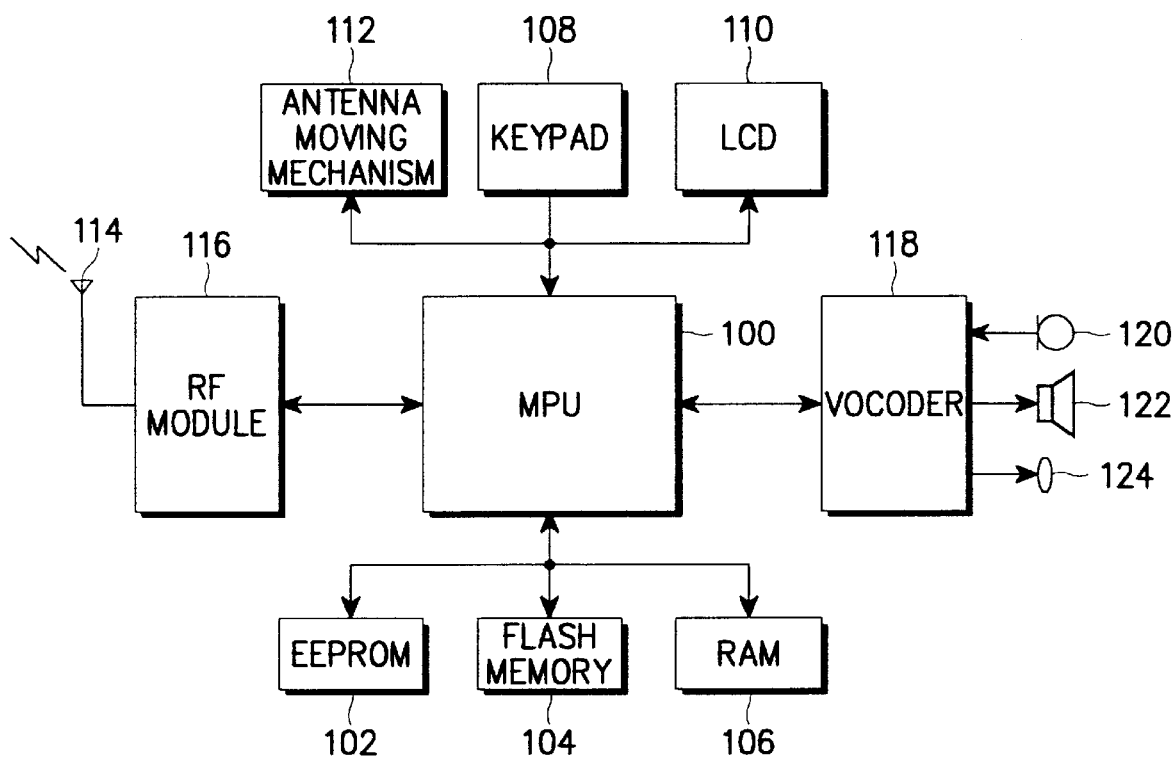
FIG. 1 is a block diagram of a portable telephone in which the present invention may be embodied.

FIG. 1 is a block diagram of a portable telephone in which the present invention may be embodied. The shown portable telephone can be a mobile phone communicating with a base station of a wireless communication system, e.g., a cellular system. The portable phone can alternatively be embodied as a cordless telephone used in the home or office, communicating with a dedicated base telephone set which is connected to a wireline telephone network.

A Microprocessor Unit (MPU) 100 processes and controls a communication session, e.g., telephone call or a data communication. An EEPROM (Electrically Erasable and Programmable Read Only Memory) 102 stores reference data for the MPU 100, and a flash memory 104 stores a program for the MPU 100. A RAM (Random Access Memory) 106 is provided as a working memory for the MPU 100. A keypad 108 having numeric keys and function keys, provides a key input by the user to the MPU 100. An LCD (Liquid Crystal Display) 110 displays various information under the control of MPU 100. An antenna moving mechanism (actuator) 112 extends and retracts the antenna under the control of MPU 100. Antenna actuators suitable for this purpose are known to those skilled in the art; one example of an antenna actuator is disclosed in U.S. Pat. No. 5,497,506, issued to Takeyasu on Mar. 5, 1996.

An RF (radio frequency) module 116 converts a signal received from MPU 100 to an RF signal and radiates it via an antenna 114. Further, RF module 116 demodulates RF signals received by antenna 114 and provides the demodulated output to MPU 100. A vocoder 118, connected to MPU 100, also connects to: a microphone 120 (a voice input device); a speaker 122 (a voice output device); and a vibrator 124 for vibrating the portable telephone to notify the user of receipt of an incoming call. The vocoder 118 encodes a voice signal received from microphone 120 to output voice data to the MPU 100, decodes the voice data received from MPU 100 to output a voice signal via speaker 122 and activates vibrator 124. It is noted here that the present invention is also applicable to portable phones utilizing analog modulation techniques, in which case the input voice signals would not be digitized by a vocoder.

The function of automatically switching an antenna mode according to an RSSI value in the portable telephone will be referred to as an "antenna switching control function" in the following description. The antenna switching control function of the illustrative embodiment can be set or released by selecting an item in a menu through the keypad 108. Setting information of the antenna switching control function is stored in EEPROM 102, similar to setting information for general functions. The selection function gives the user the option of turning the automatic switching mode off if the user so desires.

Figure 2:
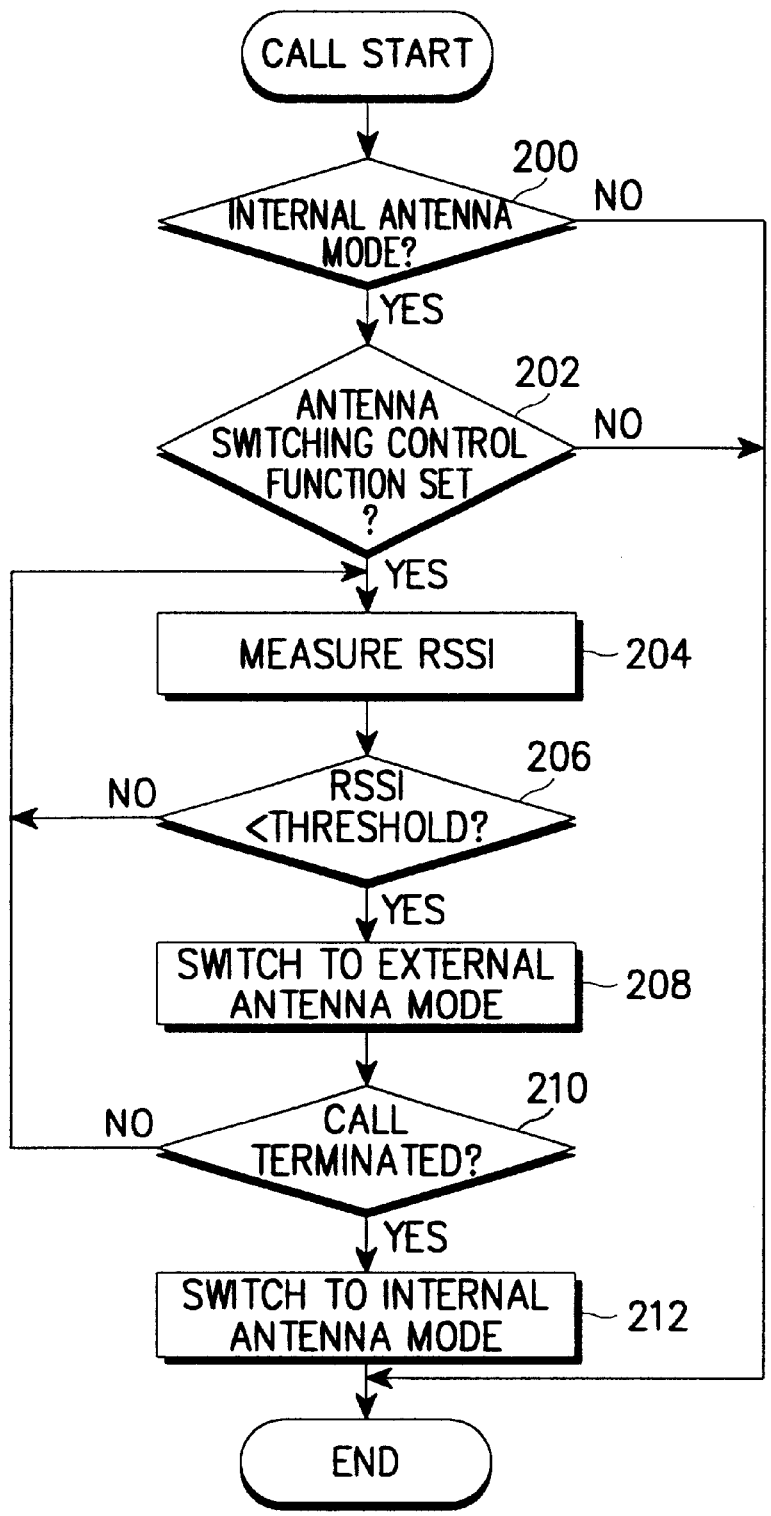
FIG. 2 is a flow chart illustrating a method of automatically switching an antenna mode according to an embodiment of the present invention.

FIG. 2 is a flow chart illustrating a method of automatically switching an antenna mode according to the present invention. If the user commences an incoming or outgoing call using the portable telephone of FIG. 1, the MPU 100 determines in step 200 if the portable telephone is in an internal antenna mode where the antenna 114 is retracted. Thus, step 200 is performed while a call is being processed. If the telephone is determined to be in an external antenna mode where antenna 114 is extended, MPU 100 completes the procedure and provides a general incoming or outgoing call service.

Contrarily, if it is determined that the portable telephone is in the internal antenna mode, the MPU 100 checks the EEPROM 102 in step 202 to determine if the antenna switching control function has been set by a user. If the antenna switching control function has not been set, the MPU 100 completes the procedure and provides the general incoming or outgoing call service. If the switching control has been set, the MPU 100 measures the RSSI value in step 204 and compares the RSSI value with a threshold value in step 206. Typically, the RSSI value is measured from the signal received from a base station through the RF module 116. The threshold value is preset by a manufacturer to a specified level where it is considered necessary to extend the antenna 114.

In steps 204 and 206, the MPU 100 continuously checks if the RSSI value is lower than the threshold value. When the RSSI value is determined to be lower than the threshold value, the MPU 100 switches the antenna mode to the external antenna mode in step 208. That is, the MPU 100 forwards a control signal to the antenna moving mechanism 112 to cause it to extend the antenna 114 to the exterior of the telephone, thereby switching the antenna mode to the external antenna mode. In step 210, the MPU 100 checks if the call is terminated, and if it isn't, the routine returns to step 204.

If the call is determined to be terminated in step 210, MPU 100 switches the antenna mode to the internal antenna mode in step 212 and then completes the procedure. That is, the MPU 100 sends another control signal to the antenna moving mechanism 112 to cause it to retract the antenna 114 to the interior of the telephone, thereby switching the antenna mode to the internal antenna mode.

Accordingly, the present invention beneficially prevents unnecessary extension of the antenna in the automatic antenna switching mode. That is, when a user has set an antenna switching control function, the antenna is automatically extended only when the RSSI value is poor, thus preventing unnecessary extension and damage of the antenna.

As described above, the present invention is advantageous in that it is possible to automatically switch the antenna mode when the communication conditions dictate, thus eliminating unnecessary extension of the antenna.

While there have been illustrated and described what are considered to be preferred embodiments of the present invention, it will be understood by those skilled in the art that various changes and modifications may be made, and equivalents may be substituted for elements thereof without departing from the true scope of the present invention. In particular, while there has been illustrated an example of setting the antenna switching control function only when the user wants to do so, it is also possible to unconditionally set the antenna switching control function regardless of the user's intention. Therefore, it is intended that the present invention not be limited to the particular embodiment disclosed as the best mode contemplated for carrying out the present invention, but that the present invention includes all embodiments falling within the scope of the appended claims.

What is claimed is:

1. A method for automatically switching an antenna mode in a portable telephone with an extendible antenna, comprising the steps of:

determining whether a user has set an antenna switching control function;

measuring a received signal strength indication (RSSI) value while a call is processed in an internal antenna mode where the antenna is retracted, and comparing the measured RSSI value with a threshold value if it is determined that said antenna switching mode has been set; and automatically extending the antenna to switch the antenna mode to an external antenna mode, when the measured RSSI value is lower than the threshold value.

2. The method as claimed in claim 1, further comprising the step of retracting the antenna to switch the antenna mode to the internal antenna mode when the call is terminated.

3. The method as claimed in claim 1, wherein the portable telephone is a mobile phone operating in a wireless communication system.

4. A method for automatically switching an antenna mode in a portable telephone with an extendible antenna, comprising the steps of:

determining whether an antenna switching control function has been set by a user, while a call is processed in an internal antenna mode where the antenna is retracted;

measuring a received signal strength indication (RSSI) value and comparing the measured RSSI value with a threshold value, when the antenna switching control function is set; and automatically extending the antenna to switch the antenna mode to an external antenna mode, when the measured RSSI value is lower than the threshold value.

5. The method as claimed in claim 4, further comprising the step of retracting the antenna to switch the antenna mode to the internal antenna mode when the call is terminated.

6. The method as claimed in claim 4, wherein the portable telephone is a mobile phone operating in a wireless communication system.

7. A method for automatically extending an antenna of a portable telephone, comprising the steps of:

determining whether an antenna switching control function has been set by a user, while said antenna is in a retracted position during a communication session;

measuring a received signal strength indication (RSSI) value and comparing the measured RSSI value with a threshold value, when the antenna switching control function is set; and automatically extending the antenna when the measured RSSI value is lower than the threshold value.

8. The method as claimed in claim 7 wherein said communication session is a voice communication session.

9. The method as claimed in claim 7 wherein said communication session is a data communication session.

10. The method as claimed in claim 7 wherein said RSSI value is measured when said communication session is commenced, and continues to be measured throughout the communication session until said RSSI is determined to be below the threshold.

11. The method as claimed in claim 7, further comprising the step of retracting the antenna when the communication session is terminated.

12. The method as claimed in claim 7, wherein the portable telephone is a mobile phone operating in a wireless communication system.

* * * * *